United States Patent
Pauritsch et al.

(10) Patent No.: US 8,120,934 B2
(45) Date of Patent: Feb. 21, 2012

(54) VOLTAGE CONVERTER AND METHOD FOR VOLTAGE CONVERSION

(75) Inventors: Manfred Pauritsch, Graz (AT); Peter Trattler, Graz (AT)

(73) Assignee: austriamicrosystems AG, Unterpremstätten (AT)

( * ) Notice: Subject to any disclaimer, the term of this patent is extended or adjusted under 35 U.S.C. 154(b) by 132 days.

(21) Appl. No.: 12/593,234

(22) PCT Filed: Mar. 25, 2008

(86) PCT No.: PCT/EP2008/053502
§ 371 (c)(1),
(2), (4) Date: Mar. 22, 2010

(87) PCT Pub. No.: WO2008/116866
PCT Pub. Date: Oct. 2, 2008

(65) Prior Publication Data
US 2010/0181973 A1    Jul. 22, 2010

(30) Foreign Application Priority Data
Mar. 26, 2007   (DE) .......................... 10 2007 014 384

(51) Int. Cl.
*H02M 3/18* (2006.01)
(52) U.S. Cl. .............................. 363/60; 363/62; 307/109
(58) Field of Classification Search .................... 363/59, 363/60, 62; 307/109, 110; 327/536
See application file for complete search history.

(56) References Cited

U.S. PATENT DOCUMENTS

| | | | | |
|---|---|---|---|---|
| 5,532,916 | A * | 7/1996 | Tamagawa | 363/62 |
| 5,606,491 | A * | 2/1997 | Ellis | 363/60 |
| 6,563,235 | B1 * | 5/2003 | McIntyre et al. | 307/109 |
| 6,906,577 | B2 * | 6/2005 | Kim | 327/536 |
| 6,960,955 | B2 * | 11/2005 | Nonaka | 327/536 |
| 7,099,166 | B2 * | 8/2006 | Kim | 363/60 |
| 7,282,985 | B2 * | 10/2007 | Yen et al. | 327/536 |
| 7,511,977 | B2 * | 3/2009 | Oyama et al. | 363/62 |

(Continued)

FOREIGN PATENT DOCUMENTS

DE    199 30 394    1/2000

(Continued)

OTHER PUBLICATIONS

"AS3682 480mA Camera Lighting Management Unit", austrimicrosystems AG, Data Sheet, Revision 2.21, pp. 1-3 and 11.

(Continued)

*Primary Examiner* — Gary L Laxton
(74) *Attorney, Agent, or Firm* — Cozen O'Connor (57) ABSTRACT

A voltage converter comprises a first, a second and a third capacitor (11, 12, 13) which are switched in series in at least one operating state, an input (1) for supplying an input voltage (VIN), an output (2) for providing an output voltage (VOUT), and a compensation circuit (5). The input (1) of the voltage converter is coupled to a capacitor from a group comprising the first, the second and the third capacitor (11, 12, 13). The output (2) of the voltage converter is coupled to a capacitor from the group comprising the first, the second and the third capacitor (11, 12, 13). The compensation circuit (5) is coupled to the first, the second and the third capacitor (11, 12, 13) and adapts a first voltage (V1) of the first capacitor (11), a second voltage (V2) of the second capacitor (12) and a third voltage (V3) of the third capacitor (13) to one another.

11 Claims, 6 Drawing Sheets

U.S. PATENT DOCUMENTS

| | | |
|---|---|---|
| 2005/0007185 A1 | 1/2005 | Kamijo |
| 2005/0213267 A1 | 9/2005 | Azrai et al. |

FOREIGN PATENT DOCUMENTS

| | | |
|---|---|---|
| DE | 10 2005 012 662 | 9/2006 |
| EP | 0 461 717 | 12/1991 |
| JP | 63-194563 | 8/1988 |
| JP | 10-117474 | 5/1998 |
| JP | 11-113249 | 4/1999 |
| JP | 2001-178115 | 6/2001 |
| WO | WO 2004/049296 | 6/2004 |

OTHER PUBLICATIONS

G. Patounakis et al., "A Fully Integrated On-Chip DC-DC Conversion and Power Management System", IEEE Journal of Solid-State Circuits, vol. 39, No. 3, pp. 443-451, Mar. 2004.

N. Hara et al., "Realization and Analysis of a New Switched-Capacitor Coilless Powersupply for One-Chip IC Implementation", Systems and Computers in Japan, vol. 29, No. 12, pp. 19-33, Nov. 15, 1988.

\* cited by examiner

VOLTAGE CONVERTER AND METHOD FOR VOLTAGE CONVERSION

RELATED APPLICATIONS

This is a U.S. national stage of application No. PCT/EP2008/053502, filed on Mar. 25, 2008.

This application claims the priority of German application no. 10 2007 014 384.4 filed Mar. 26, 2007, the entire content of which is hereby incorporated by reference.

FIELD OF THE INVENTION

The present invention relates to a voltage converter and a method for voltage conversion.

BACKGROUND OF THE INVENTION

Voltage converters which are termed as direct current/direct current converters, in short DC/DC converters, are normally used for converting an input voltage into an output voltage. In a step-up converter, the output voltage is higher than the input voltage. In a step-down converter, however, the output voltage is lower than the input voltage.

SUMMARY OF THE INVENTION

It is an object of the present invention to provide a voltage converter and a method for voltage conversion, which are suitable for both step-up and step-down conversions.

This and other objects are attained in accordance with one aspect of the present invention directed to a voltage converter, comprising a first, a second and a third capacitor which are connected in series in at least one operating state; an input for supplying an input voltage; an input change-over switch having an input side that is connected to the input of the voltage converter and an output side that is connected to at least two capacitors from the group comprising the first, the second and the third capacitor; an output for providing an output voltage and coupled to a capacitor from the group comprising the first, the second and the third capacitor; and a compensation circuit which is coupled to the first, the second and the third capacitor in such a manner that a first voltage of the first capacitor, a second voltage of the second capacitor and a third voltage of the third capacitor are adapted to one another; one switch each being used in the input change-over switch and/or in the compensation circuit, wherein said switch comprises a switching element and a resistor which are arranged in series connection, with the resistor being realized as a controllable resistor which is connected to an amplifier at a control input, and the amplifier having its input side connected to the output of the voltage converter and a voltage source, or said switch being realized as a transistor with a turn-on resistance that is controlled by an amplifier, with the amplifier having its input side connected to the output of the voltage converter and a voltage source so that the transistor is operated in an ON state in which it has different turn-on resistances which are controlled by the amplifier as well as in an OFF state.

Another aspect of the present invention is directed to a method for voltage conversion, comprising the steps of supplying an input voltage to an input of an input change-over switch; providing the input voltage selectively (a) at a first output of the input change-over switch connected to an electrode of a capacitor from a group comprising a first, a second and a third capacitor, or (b) at least one further output of the input change-over switch connected to an electrode of a further capacitor from the group comprising the first, the second and the third capacitor, the first, the second and the third capacitor being connected in series at least in one operating state; adapting a first voltage of the first capacitor, a second voltage of the second capacitor and a third voltage of the third capacitor to one another by means of a compensation circuit; and providing an output voltage which can be tapped between an electrode of a capacitor from the group comprising the first, the second and the third capacitor and a reference potential terminal; one switch each being used in the input change-over switch and/or in the compensation circuit, said switch comprising a switching element and a resistor which are arranged in series connection, with the resistor being realized as a controllable resistor which is connected to an amplifier at a control input, and the amplifier having its input side connected to the output of the voltage converter and a voltage source, or said switch being realized as a transistor with a turn-on resistance that is controlled by an amplifier, with the amplifier having its input side connected to the output of the voltage converter and a voltage source so that the transistor is operated in an ON state in which it has different turn-on resistances which are controlled by the amplifier as well as in an OFF state.

In one embodiment, a voltage converter comprises first, second and third capacitors. An input of the voltage converter is coupled to a capacitor from a group comprising the first, second and third capacitors. Furthermore, an output of the voltage converter is coupled to the capacitor or a further one from the group comprising the first, second and third capacitors. In addition, the voltage converter comprises a compensation circuit which is coupled to the first, second and third capacitors.

The input of the voltage converter serves for supplying an input voltage to the voltage converter. The input voltage is fed to the capacitor which is connected to the input of the voltage converter. The first, second and third capacitors are connected in series at least in one operating state. A first voltage can be tapped at the first capacitor, a second voltage at the second capacitor and, correspondingly, a third voltage at the third capacitor. The compensation circuit is provided for adapting the first, second and third voltages to one another. An output voltage is provided at the output of the voltage converter.

Advantageously, the compensation circuit has the effect that the first, second and third voltages show approximately equal magnitudes. Due to the series connection of the three capacitors and the coupling of the input to one of the three capacitors, the third voltage, for example, or alternatively the sum of the second and third voltages or again alternatively the sum of the first, second and third voltages can be approximately equal to the input voltage. The first voltage can be equal to the input voltage, to half the input voltage or to a third of the input voltage, for instance.

In a preferred embodiment, the coupling of the input of the voltage converter to a capacitor from the group comprising the first, second and third capacitors means that the input is coupled to an electrode of a capacitor from the group comprising the first, second and third capacitors. Likewise, the coupling of the output of the voltage converter to the capacitor or another one from the group comprising the first, second and third capacitors means that the output is coupled to an electrode of the capacitor or another one from the group comprising the first, second and third capacitors.

Due to the series connection of the three capacitors and the coupling of the output of the voltage converter to one of the three capacitors it is advantageously possible to provide the third voltage as an output voltage, for example. Alternatively, the sum of the second and third voltages or the sum of the first, second and third voltages can be provided at the output of the voltage converter. It is advantageously possible to determine whether the voltage converter is designed as a step-up or step-down converter by selecting the capacitor which is coupled to the input of the voltage converter and the capacitor which is coupled to the output of the voltage converter. An inductive element is not required.

In order to couple the input of the voltage converter to a capacitor, the voltage converter comprises in one embodiment an input change-over switch which has its input side connected to the input of the voltage converter and has its output side connected to at least two capacitors from the group comprising the first, second and third capacitors. Therefore, the input change-over switch has at least two outputs. An output of the input change-over switch is connected to an electrode of a capacitor from the group comprising the first, second and third capacitors. At least one further output of the input change-over switch is connected to an electrode of at least one further capacitor from the group comprising the first, second and third capacitors. The input change-over switch advantageously couples the input of the voltage converter to electrodes of different capacitors so as to be switchable.

The voltage converter is realized without any inductive element in one embodiment. Advantageously, the voltage converter is realized as a charge pump. A step-down converter can be referred to as a buck converter and a step-up converter can be termed a boost converter.

The compensation circuit can e.g. transfer a charge between the three capacitors by interchanging at least two of the three capacitors with one another or by comprising a compensating capacitor which is alternately connected in parallel to at least one of the three capacitors.

In one embodiment, a method for voltage conversion comprises supplying an input voltage to a capacitor from a group comprising first, second and third capacitors. In this arrangement, the first, second and third capacitors are provided in series connection in at least one operating state. A first voltage of the first capacitor, a second voltage of the second capacitor and a third voltage of the third capacitor are adapted to one another. An output voltage is able to be tapped at a capacitor from the group comprising the first, second and third capacitors.

Due to the charge exchange of the three capacitors, the value of the first, second and third voltages is approximately the same. Due to the supply of the input voltage to a capacitor, a first number L of capacitors is determined across which the input voltage is applied. As an output voltage, a voltage is provided which is applied across a second number M of capacitors. Thus, the output voltage has approximately the M/L-fold value of the input voltage.

An upward conversion exists with a ratio M/L greater than 1, and a downward conversion exists with a ratio M/L smaller than 1. The ratio M/L can adopt all positive integers and all positive fractional numbers.

In order to supply the input voltage, it is applied in one embodiment between an electrode of a capacitor from the group comprising the first, second and third capacitors and a reference potential terminal. For tapping the output voltage, the latter is tapped between an electrode of the capacitor or a further capacitor from the group comprising the first, second and third capacitors and the reference potential terminal.

In one embodiment, the input voltage is supplied to an input of an input change-over switch. The input voltage is selectively provided at a first output or at least one further output of the input change-over switch. The first output is connected to an electrode of a capacitor from the group comprising the first, second and third capacitors. The at least one further output is connected to an electrode of a further capacitor from the group comprising the first, second and third capacitors. It is advantageously possible to switch between at least two outputs of the input change-over switch so that one can select between which electrode of one of the capacitors and the reference potential terminal the input voltage is applied. In this way, it is advantageously possible to adjust the ratio between the output voltage and input voltage in use.

BRIEF DESCRIPTION OF THE DRAWINGS

The invention is explained in more detail below by means of several exemplary embodiments with the aid of the Figures. Components and circuit parts with the same function and effects have identical reference numerals. In so far as circuit parts or components have identical function, the description thereof is not repeated in each of the following Figures.

DETAILED DESCRIPTION OF THE DRAWINGS

Figure 1A:
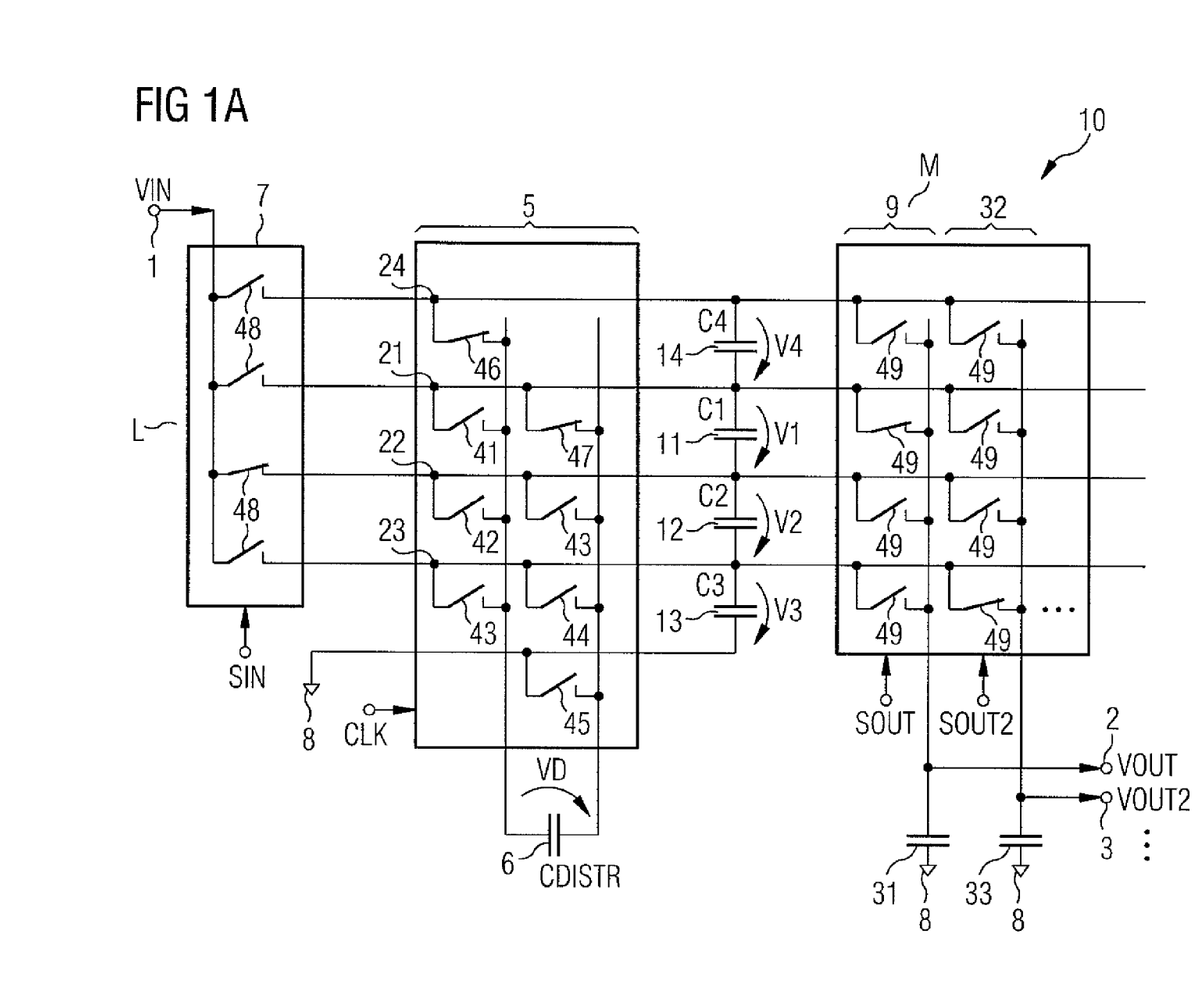
FIGS. 1A and 1B show an exemplary embodiment of a voltage converter according to the invention.

FIG. 1A shows an exemplary embodiment of a voltage converter according to the invention. The voltage converter 10 comprises an input 1, an output 2, a compensation circuit 5 as well as first, second and third capacitors 11 to 13. The compensation circuit 5 comprises first, second and third nodes 21 to 23. The three nodes 21 to 23 are coupled to the input 1, the output 2 and the three capacitors 11 to 13. The three capacitors 11 to 13 are connected in series, the series connection being arranged between the first node 21 and a reference potential terminal 8. In this arrangement, the first capacitor 11 is inserted between the first and second nodes 21, 22, and the second capacitor 12 is inserted between the second and third nodes 22, 23. Furthermore, the third capacitor 13 is inserted between the third node 23 and the reference potential terminal 8.

The compensation circuit 5 comprises a compensating capacitor 6. A first electrode of the compensating capacitor 6 is coupled to the three nodes 21 to 23 via one switch 41 to 43 in each case. A second electrode of the compensating capacitor 6 is coupled to the second and third nodes 22, 23 via one switch 43, 44 in each case and is coupled to the reference potential terminal 8 via a further switch 45. The first electrode of the compensating capacitor 6 is therefore coupled to a first electrode of the first capacitor 11 via the switch 41 and to a second electrode of the first capacitor 11 via the switch 43. Similarly, the compensating capacitor 6 is coupled to the second capacitor 12 via the two switches 42, 44 and to the third capacitor 13 via the two switches 43, 45.

The voltage converter 10 further comprises a fourth capacitor 14 which is connected in series to the first, second and third capacitors 11 to 13. The compensation circuit 5 has a fourth node 24. The fourth capacitor 14 is inserted between the fourth and first nodes 24, 21. The compensating capacitor 6 is coupled to the fourth capacitor 14 via two additional switches 46, 47.

The voltage converter 10 further comprises an input change-over switch 7 which couples the input 1 to the four nodes 21 to 24. The input change-over switch 7 therefore comprises an input which is connected to the input 1, four switches 48 and four outputs each connected to one of the four nodes 21 to 24. Furthermore, the voltage converter 10 comprises an output change-over switch 9 coupling the four nodes 21 to 24 to the output 2. The output change-over switch 9 therefore comprises four inputs which are connected to the four nodes 21 to 24, four switches 49 as well as an output which is connected to the output 2 of the voltage converter 10. Each one of the four nodes 21 to 24 is coupled to the output 2 through one of the four switches 49. An output capacitor 31 is arranged between the output 2 and the reference potential terminal 8.

The voltage converter 10 further has a second output 3, a second output change-over switch 32 and a second output capacitor 33. The second output change-over switch 33 couples the four nodes 21 to 24 to the second output 3. The second output capacitor 33 is inserted between the second output 3 and the reference potential terminal 8.

An input voltage VIN is supplied to the input 1 of the voltage converter 10. An equalizing voltage VD can be tapped at the compensating capacitor 6. First, second and third voltages V1, V2, V3 as well as a fourth voltage V4 are applied to the first, second, third and fourth capacitors 11 to 14. The equalizing voltage VD is applied between the two electrodes of the compensating capacitor 6. The first voltage V1 is applied between the two electrodes of the first capacitor 11. Same applies to the second, third and fourth capacitors 12 to 14. An output voltage VOUT is provided at the output 2 and a second output voltage VOUT2 is provided at the second output 3. The input voltage VIN and the output voltages VOUT, VOUT2 are voltages which are related to a potential of the reference potential terminal 8. The mode of operation is explained in more detail with the aid of FIG. 1B.

Figure 1B:
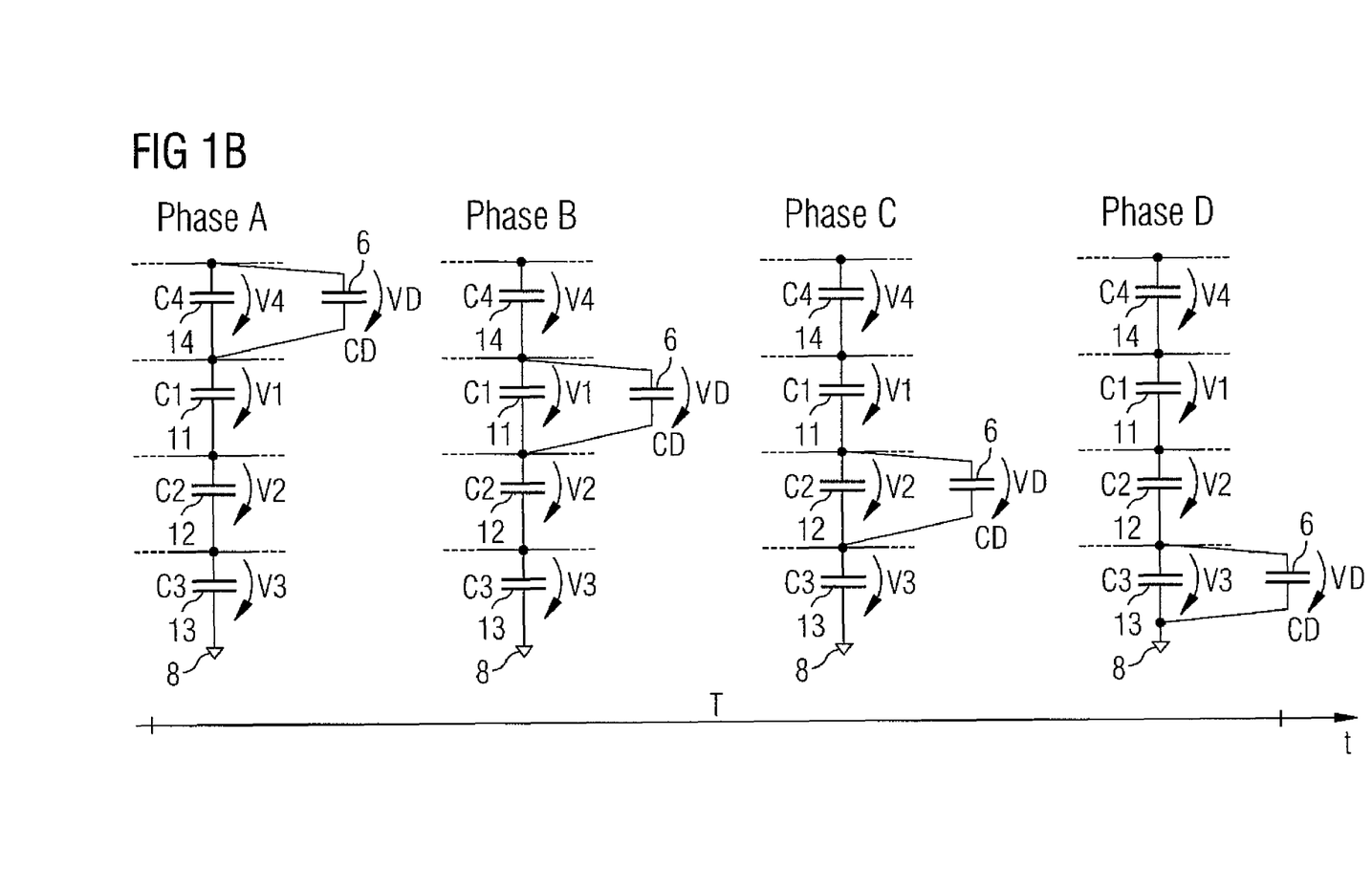

FIG. 1B shows exemplary operating states of the voltage converter 10 shown in FIG. 1A. The four operating states A, B, C, D are passed through cyclically with a cycle duration T. The compensating capacitor 6 is connected to the fourth capacitor 14 in the operating state A. The switch position, shown in FIG. 1A, of switches 41 to 47 of the compensation circuit 5 shows the operating state A. If the equalizing voltage VD is not equal to the fourth voltage V4 before the beginning of the operating state A, a charge equalization is made possible by the connection of the fourth capacitor 14 and the compensating capacitor 6 so that the equalizing voltage VD is approximately equal to the fourth voltage V4 at the end of the operating state A. Thus, the switches 46 and 47 are closed and the further switches 41 to 45 are open in the operating state A. In the operating state B, the compensating capacitor 6 is connected to the first capacitor 11, in the operating state C it is connected to the second capacitor 12 and in the operating state D to the third capacitor 13. In the operating state B, a first electrode of the compensating capacitor 6 is connected to a first electrode of the first capacitor 11, and a second electrode of the compensating capacitor 6 is connected to a second electrode of the first capacitor 11. Operating state D is again followed by operating state A. After operating state D, operating state A starts again.

The input change-over switch 7 couples the input 1 in a switchable manner to an electrode of one of the capacitors 11 to 14 via one of the four nodes 21 to 24. According to the switching state of the input change-over switch 7 as shown in FIG. 1A, the second node 22, and along with it the electrode pertaining to the second capacitor 12 and connected to the second node 22 is connected to the input 1 since the respective switch is closed and the further switches of the input change-over switch 7 are open. The input change-over switch 7 supplies the input voltage VIN selectively to an electrode of one of the capacitors 11 to 14 through one of the four nodes 21 to 24. In FIG. 1A, the input voltage VIN is applied between the electrode pertaining to the second capacitor 12 and connected to the second node 22, and the reference potential terminal 8. Thus, the input voltage VIN is applied to the series connection comprising the second and third capacitors 12, 13. It is achieved by means of the compensation circuit 5 that the second and third voltages V2, V3 are approximately equal and correspond in each case to half of the input voltage VIN. As the compensation circuit 5 has the effect that the first and the fourth voltages V1, V4 are likewise approximately half of the input voltage VIN, two times the amount of the input voltage VIN is applied to the fourth node 24, 1.5 times that of the input voltage VIN is applied to the first node 21, the input voltage VIN is applied to the second node 22 and half the input voltage VIN is applied to the third node 23.

The output change-over switch 9 selectively couples an electrode of one of the capacitors 11 to 14 to the output 2 via one of the nodes 21 to 24. The output change-over switch 9 taps the output voltage VOUT between an electrode of one of the capacitors 11 to 14 via one of the nodes 21 to 24 and the reference potential terminal 8. In doing so, the electrode can be selected by means of the output change-over switch 9. According to the switching state of the output change-over switch 9 which is shown in FIG. 1A, the first node 21, and hence an electrode of the first capacitor 11 and connected to the first node 21, is connected to the output 2. The output voltage VOUT is applied between this electrode of the first capacitor 11 and the reference potential terminal 8. Therefore, the output voltage VOUT applied to the output 2 has 1.5 times the magnitude of the input voltage VIN. Since according to FIG. 1A the third node 23 is connected to the second output 3 via the second output change-over switch 32, the second output voltage VOUT2 is approximately equivalent to half the input voltage VIN.

In this way, it is possible to adjust a ratio of the output voltages VOUT, VOUT2 in relation to the input voltage VIN in a very flexible and advantageous way by selecting the position of the input change-over switch 7 and of the two output change-over switches 9, 32. Both upward and downward conversions of the input voltage VIN are possible.

In an alternative embodiment which is not shown, at least one additional capacitor is provided in series connection with the four capacitors 11 to 14. The compensation circuit 5 has further switches for connecting the at least one additional capacitor to the compensating capacitor 6. The compensation circuit 5 further comprises at least one additional node which is connected to the input via the input change-over switch 7 and to the outputs 2, 3 via the output change-over switches 9, 32.

The input change-over switch 7 can alternatively have less than four outputs and be connected to two or three of the four nodes 21 to 24.

In an alternative embodiment which is not shown, the input change-over switch 7 is omitted and one of the four nodes 21 to 24 is directly and permanently connected to the input 1 of the voltage converter 10. Therefore, there is a fixed setting regarding the first number L of capacitors across which the input voltage VIN is permanently applied.

The output change-over switch 9 may alternatively have less than four inputs and be connected to two or three of the four nodes 21 to 24.

In an alternative embodiment which is not shown, the output change-over switch 9 is omitted. Instead, the output 2 is directly and permanently connected to one of the nodes 21 to 24. Therefore, there is a fixed setting regarding the second number M of capacitors across which the output voltage VOUT is tapped.

In an alternative embodiment which is not shown, the compensation circuit 5 comprises a further compensating capacitor which is used according to the compensating capacitor 6.

Figure 2A:
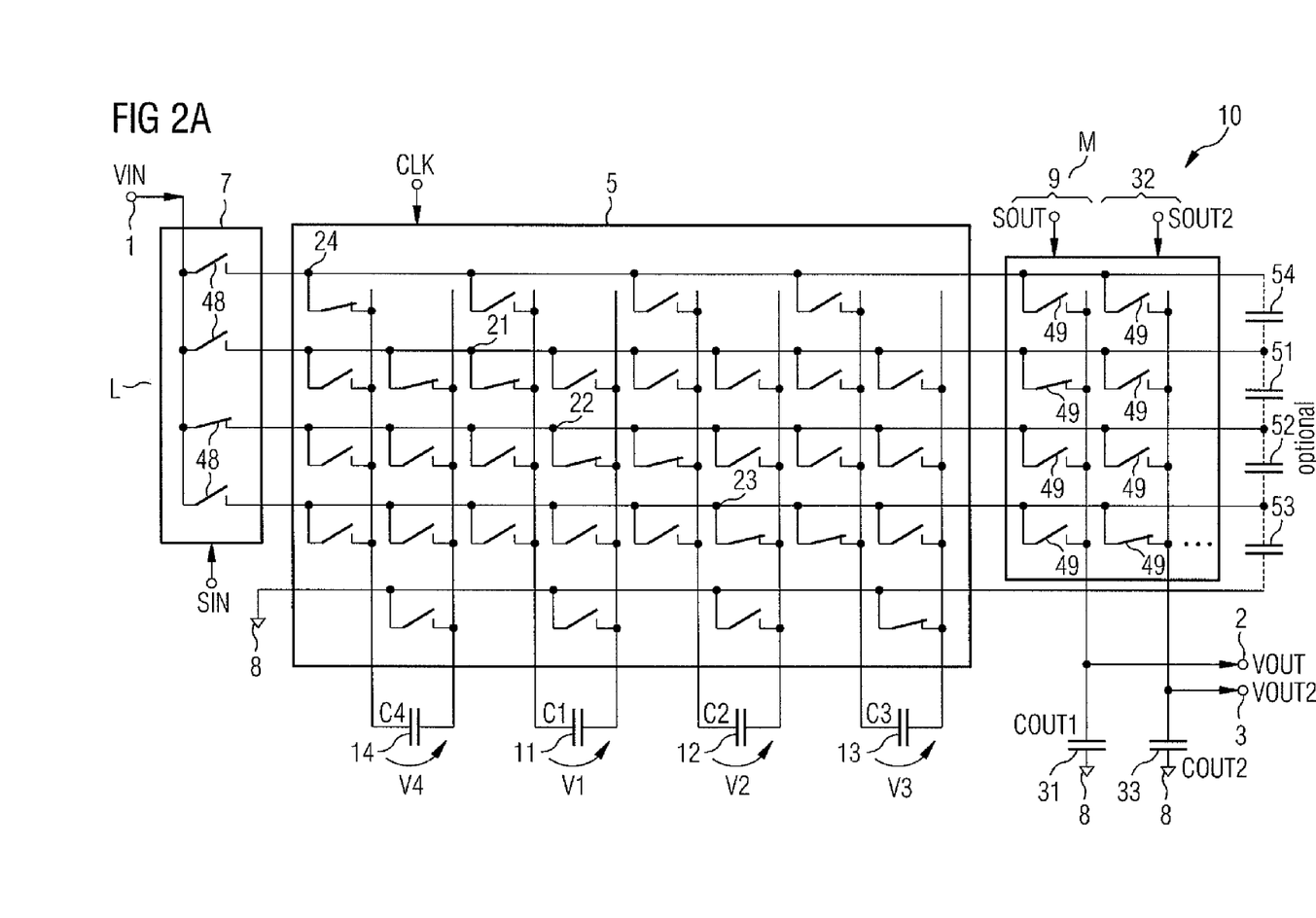
FIGS. 2A to 2C show a further exemplary embodiment of a voltage converter according to the invention.

FIG. 2A shows a further exemplary embodiment of the voltage converter according to the invention. Unlike the voltage converter according to FIG. 1A, the four capacitors 11 to 14 of the voltage converter 10 according to FIG. 2A are not permanently connected to the four nodes 21 to 24. The four capacitors 11 to 14 are coupled to the four nodes 21 to 24 through switches. All first electrodes of the four capacitors 11 to 14 are coupled to the fourth node 24 through one switch each. The first and second electrodes of the four capacitors 11 to 14 are coupled to the first, second and third nodes 21, 22, 23 through one switch each. The second electrodes of the four capacitors 11 to 14 are coupled to the reference potential terminal 8 through one switch each. The input change-over switch 7 selectively couples the input 1 to one of the four nodes 21 to 24. This is the second node 22 in FIG. 2A.

The voltage converter 10 comprises first, second, third and fourth additional capacitors 51 to 54 which are connected in series. The first capacitor 51 is arranged between the first and second nodes 21, 22. Similarly, the second and third additional capacitors 52, 53 are inserted between the second and third nodes 22, 23 and between the third node 23 and the reference potential terminal 8, respectively. The fourth additional capacitor 54 is arranged between the fourth node 24 and the first node 21. The mode of operation is explained on the basis of FIG. 2B.

Figure 2B:
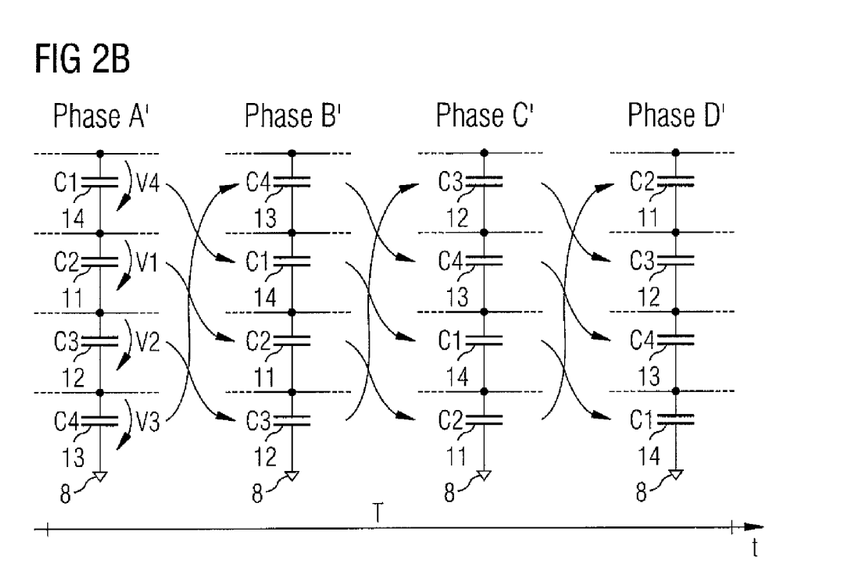

FIG. 2B shows an exemplary embodiment of four operating states A' to D'. Operating state A' corresponds to the switch position of the compensation circuit 5 as illustrated in FIG. 2A. According to the operating state A', the fourth capacitor 14 is inserted between the fourth node 24 and the first node 21, the first capacitor 11 between the first node 21 and the second node 22, the second capacitor 12 between the second node 22 and the third node 23, and the third capacitor 13 between the third node 23 and the reference potential terminal 8. The input change-over switch 7 couples the input 1 to an electrode of one of the capacitors 11 to 14, which electrode is connected to the selected node. In the operating state A', this is the electrode, connected to the second node 22, of the second capacitor 12. The input change-over switch 7 delivers the input voltage VIN of the electrode connected to the selected node to one of the capacitors 11 to 14. As the input voltage VIN is applied between the second node 22 and the reference potential terminal 8, the input voltage VIN is therefore applied to the series connection comprising the second and third capacitors 12, 13. Thus, the first number L is 2. The sum of the second voltage V2 and third voltage V3 therefore corresponds to the input voltage VIN. The output change-over switch 9 selectively couples one of the four nodes 21 to 24 to the output 2. The output change-over switch 9 taps the output voltage VOUT at an electrode, connected to the selected node, of one of the capacitors 11 to 14. The first node 21 is selected in FIG. 2A. In the operating state A', the output voltage is tapped between the electrode, connected to the first node 21, of the first capacitor 11 and the reference potential terminal 8. As the output capacitor 31 is connected to the first node 21 according to the switch position of the output change-over switch 9 in FIG. 2A, the sum of the first, second and third voltages V1, V2, V3 is thus applied to the output capacitor 31. Hence, the second number M is 3.

The four capacitors 11 to 14 are cyclically interchanged by changing the operating states A', B', C', D'. The operating states A' to D' are repeated periodically with the cycle duration T. Due to the connection of the input 1 with the second node 22, a current flows to the capacitor which is respectively connected to the second node 22 so that a charge flows to the first capacitor 11 in the operating state B', to the fourth capacitor 14 in the operating state C' and to the third capacitor 13 in the operating state D'. Due to the connection of the output capacitor 31 to the first node 21, the output capacitor 31 is charged in each operating state to the sum of the voltages of the three capacitors that are arranged between the first node 21 and the reference potential terminal 8. By the cyclical interchange of the capacitors 11 to 14, the four voltages V1, V2, V3, V4 are advantageously adapted to one another. The output voltage VOUT is equal to M/L times the input voltage VIN.

Operating states fewer than the four operating states A', B', C', D' can be provided. At least two operating states are preferably provided. It is advantageously provided by means of the operating states that a charge path is available between the four capacitors 11 to 14 to distribute the charge and keep the voltages V1, V2, V3, V4 across the four capacitors 11 to 14 at approximately the same level.

Figure 2C:
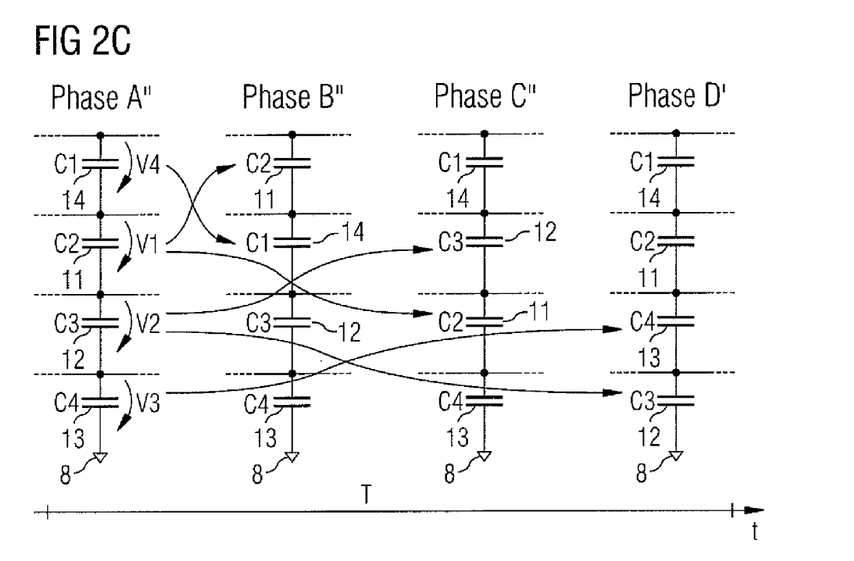

FIG. 2C shows a further exemplary embodiment of operating states A" to D", which is a further development of the operating states according to FIG. 2B. In the operating state A", the fourth, first, second and third capacitors 14, 11, 12, 13 are provided in series connection between the fourth node 24 and the reference potential terminal 8. The order of the four capacitors 11 to 14 according to the operating state B" is changed such that the first, fourth, second and third capacitors 11, 14, 12, 13 are provided in series connection. According to the operating state C", the fourth, second, first and third capacitors 14, 12, 11, 13 are provided in series connection. In contrast, the fourth, first, third and second capacitors 14, 11, 13, 12 are provided in series connection in this order in the operating state D".

Figure 3:
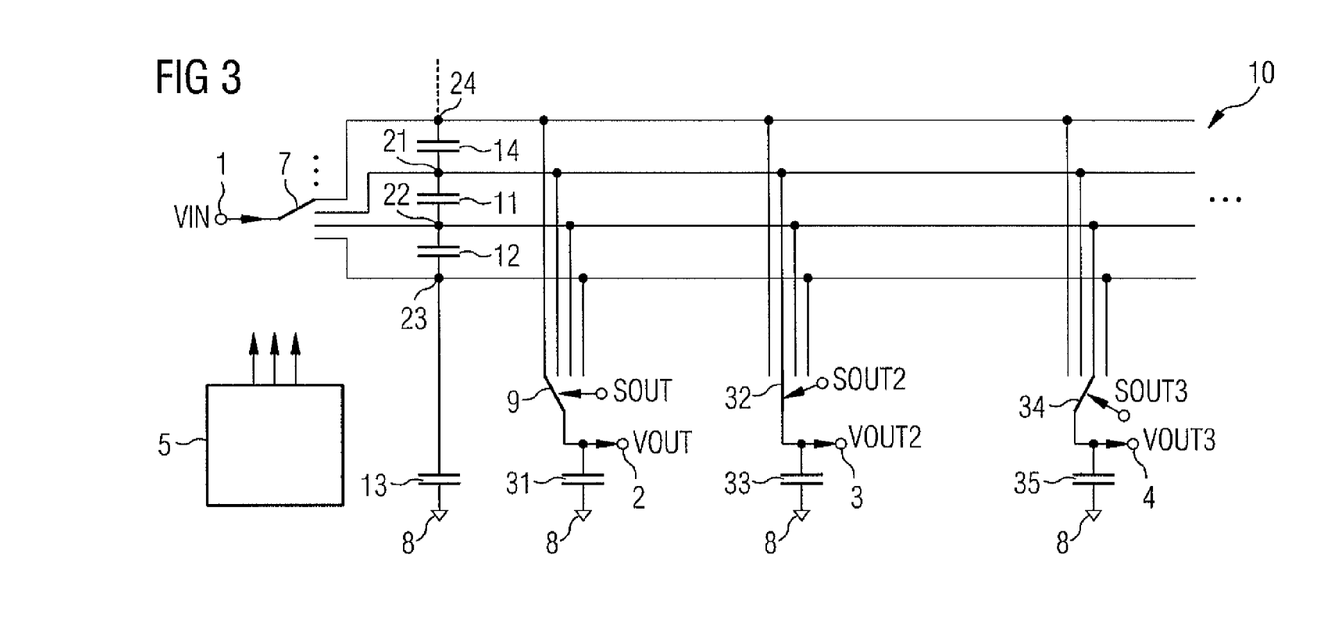
FIG. 3 shows an alternative exemplary embodiment of a voltage converter according to the invention.

FIG. 3 shows a further exemplary embodiment of the voltage converter according to the invention. For reasons of clarity, the compensation circuit 5 is indicated only schematically. The voltage converter 10 according to FIG. 3 comprises a third output 4 and a third output change-over switch 34. The third output 4 is connected to the reference potential terminal 8 via a third output capacitor 35. A third output voltage VOUT3 is provided at the third output 4. The third output change-over switch 34 couples the third output 4 to the four nodes 21 to 24. The inductor-less voltage converter 10 thus advantageously comprises several outputs 2, 3, 4 which are connected in parallel and can be supplied very efficiently because various ratios of output voltages to the input voltage can be realized at the same time.

Figures 4A, 4B:
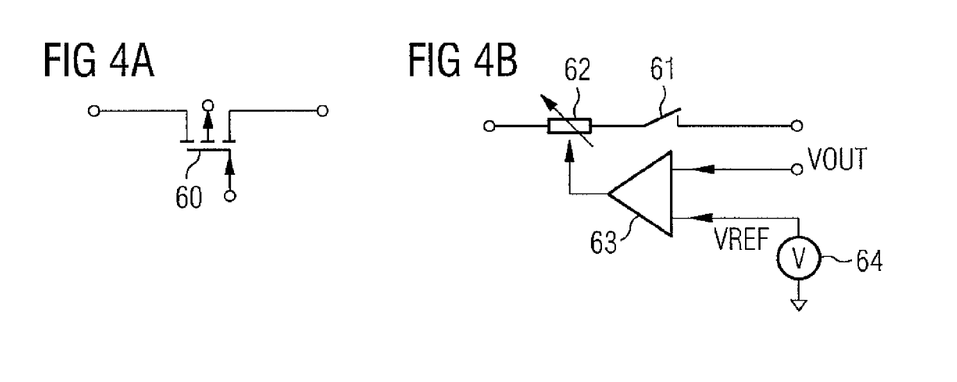
FIGS. 4A and 4B show two exemplary embodiments of a switch.

FIG. 4A shows an exemplary embodiment of a switch as can be used in the embodiments of the voltage converter. The switch shown in FIG. 4A can be used in the input change-over switch 7, in the compensation circuit 5 and in the output change-over switches 9, 32, 34, for example. The switch comprises a transistor 60. The transistor 60 is realized as a field effect transistor. The transistor is preferably configured as a metal oxide semiconductor field effect transistor, in short MOSFET.

FIG. 4B shows an alternative exemplary embodiment of a switch as can be used in the suggested voltage converter. The switch comprises a switching element 61 and a resistor 62 which are provided in series connection. The resistor 62 is configured as a controllable resistor which has its control input connected to an amplifier 63. At its input side, the amplifier 63 is connected to the output 2 of the voltage converter 10 and to a voltage source 64. It is possible by means of the switch to make a fine adjustment of the ratio of output voltage to input voltage VOUT/VIN. The switch advantageously has the effect that the resistance value is adjusted to a high level if the output voltage VOUT is higher than a reference voltage VREF provided by the voltage source 64. This is why current peaks and hence switching noises can be reduced. In an alternative embodiment, a transistor is provided instead of the switching element 61 and the resistor 62, whose turn-on resistance is controlled by the amplifier 63. The transistor is operated in an OFF-status as well as in an ON-status in which it has different turn-on resistances controlled by the amplifier 63.

Figure 5A:
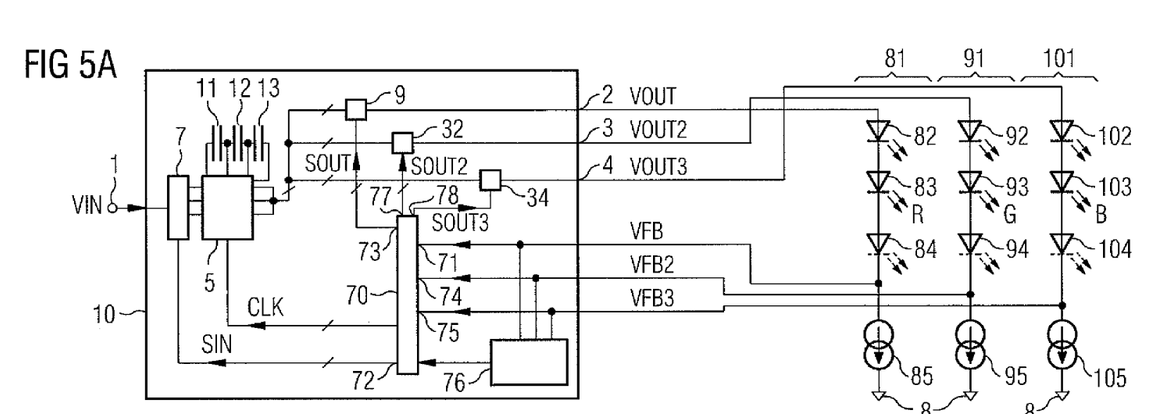
FIGS. 5A and 5B show two further exemplary embodiments of a voltage converter according to the invention with an electrical load connected.

FIG. 5A shows a further exemplary embodiment of the voltage converter, which is a further development of the voltage converter shown in FIGS. 1A, 2A and 3. The output change-over switch 9 couples the compensation circuit 5 to the output 2. Similarly, the second and third output change-over switches 32, 34 couple the compensation circuit 5 to the second and third outputs 3, 4, respectively. The voltage converter 10 additionally comprises a control device 70 which has a feedback input 71 as well as first and second control outputs 72, 73. The first control output 72 is connected to a control input of the input change-over switch 7. Further, the second control output 73 is connected to a control input of the output change-over switch 9. Moreover, the control device 70 comprises second and third feedback inputs 74, 75. The voltage converter 10 comprises a selection circuit 76 which is connected to the three feedback inputs 71, 74, 75 and the control device 70. Third and fourth control outputs 77, 78 of the control device 70 are connected to a control input of the second output change-over switch 32 and a control input of the third output change-over switch 34, respectively. The control device 70 is further connected to a clock input of the compensation circuit 5.

A first electrical load 81 is connected to the output 2 of the voltage converter 10. The first electrical load 81 comprises a series connection which includes e.g. three light-emitting diodes 82 to 84 and a current source 85. The first electrical load 81 is inserted between the output 2 and the reference potential terminal 8. A node between the three light-emitting diodes 82 to 84 and the first current source 85 is connected to the feedback input 71. The feedback input 71 is coupled to the output 2 via the first electrical load 81. Furthermore, the arrangement comprises second and third electrical loads 91, 101 which are configured like the first electrical load 81, for example. The second and third electrical loads 91, 101 are connected to the second and third outputs 3, 4, respectively.

The first, second and third output voltages VOUT, VOUT2, VOUT3 are delivered at the three outputs 2, 3, 4. The three output voltages VOUT, VOUT2, VOUT3 are fed to the three electrical loads 81, 91, 101. In this arrangement, the current flowing through the first electrical load 91 is limited by the first current source 85. The light-emitting diodes 82 to 84 emit electromagnetic radiation. A feedback voltage VFB can be tapped at the first current source 85 and is supplied to the feedback input 71. Similarly, second and third feedback voltages VFB2, VFB3 can be tapped at the second and third current sources 95, 105 and are supplied to the second and third feedback inputs 74, 75, respectively. The selection circuit 76 passes on the one of the three feedback voltages VFB, VFB2, VFB3 that has the lowest voltage value to the control device 70. By means of the value of the lowest feedback voltage VFB, VFB2, VFB3, the switch position of the input change-over switch 7 is determined by the control device 70.

To this end, a first control signal SIN is provided at the first control output 72 and supplied to the input change-over switch 7.

The control device 70 further determines the switch position of the output change-over switch 9 depending on the value of the feedback voltage VFB. It provides a second control signal SOUT at the second control output 73, which serves for adjusting the output change-over switch 9. Depending on the second and third feedback voltages VFB2, VFB3, the control device 70 correspondingly provides third and fourth control signals SOUT2, SOUT3 at the third and fourth control outputs 77, 78, respectively, which signals are delivered to the second and third output change-over switches 32, 34, respectively. To this end, the control device 70 compares the three feedback voltages VFB, VFB2, VFB3 with a reference voltage and changes the position of the output change-over switches 9, 32, 34 in such a manner that the respective feedback voltage is larger than the reference voltage. If an increase in the respective output voltage VOUT, VOUT2, VOUT3 is not possible by changing the switch position of the output change-over switches 9, 32, 34 so that the respective feedback voltage VFB, VFB2, VFB3 is larger than the reference voltage, the switch position of the input change-over switch 7 is changed such that the output voltages VOUT, VOUT2, VOUT3 are increased. The control device 70 delivers a clock signal CLK to the equalizing circuit 5, which serves for setting the switches in the compensation circuit 5 for the operating states A, B, C, D.

An efficient operating point of the voltage converter 10 and the light-emitting diodes 82 to 85, 92 to 95, 102 to 104 can be achieved by means of the control device 70 in a favorable way. This allows to keep the dissipation power of the voltage converter 10 low.

The control device 70 can be implemented as a digital circuit. The control device 70 can be realized as a state machine. Alternatively, the control device 70 can be formed as a microprocessor or a microcontroller. In an embodiment, the control device 70 is implemented similarly to the circuit Digital Part in the device AS3682, manufactured by austriamicrosystems AG, Austria, wherein the device AS3682 is described in "AS3682 480 mA Camera Ligthing Management Unit", austriamicrosystems AG, Data Sheet, Revision 2.21.

In an embodiment, the control device 70 can be implemented as a microcontroller of the PIC family, manufactured by Microchip Technology Inc., Chandler, Ariz., for example the microcontroller PIC16F1936. In an alternative embodiment, the control device 70 can be a microcontroller P89LPC916, manufactured by NXP Semiconductors, The Netherlands, formerly Philips. The microcontroller P89LPC916 comprises a 8051 core.

The arrangement according to FIG. 5A can be used for an RGB light-emitting diode arrangement. Here, the light-emitting diodes 82 to 84 are LEDs which emit light in the red wavelength range, the light-emitting diodes 92 to 94 are LEDs operating in the green wavelength range and the light-emitting diodes 102 to 104 are configured as LEDs emitting light in the blue wavelength range. The voltage converter 10 is usable for an RGB light-emitting diode arrangement as the various light-emitting diodes need different forward voltages for their operation, which can be provided in an efficient way by means of the multiple outputs 2, 3, 4.

Figure 5B:
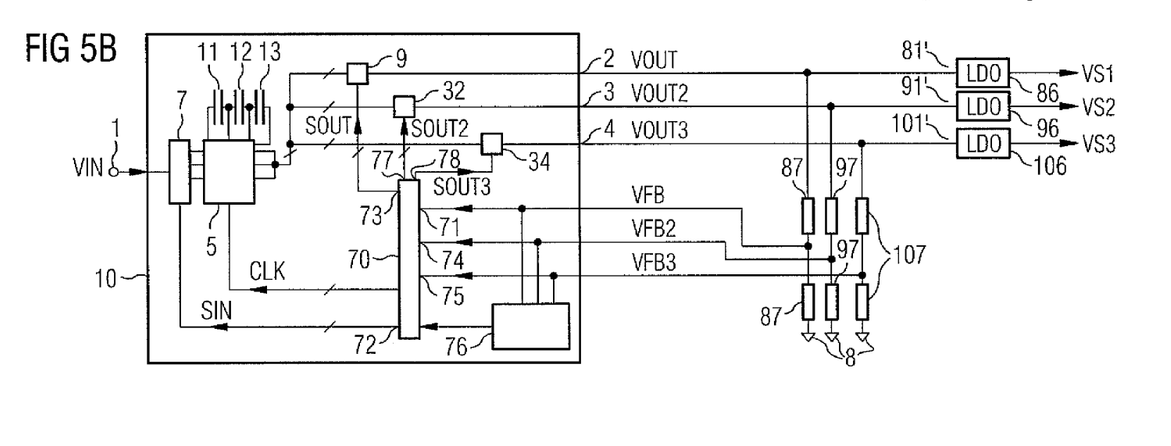

FIG. 5B shows a further exemplary embodiment of a voltage converter, which is a further development of the voltage converter according to FIG. 5A. According to FIG. 5B, the first electrical load 81' comprises a first low drop out regulator 86, in short LDO. The second and third electrical loads 91', 101' comprise second and third voltage regulators 96, 106. A first voltage divider 87 connects the output 2 to the reference potential terminal 8. A tap point of the voltage divider 87 is connected to the feedback input 71. Similarly, second and third voltage dividers 97, 107 are inserted between the second and third outputs 3, 4, respectively, and the reference potential terminal 8. A tap point of the second voltage divider 97 and a tap point of the third voltage divider 107 are connected to the second and third feedback inputs 74, 75, respectively.

The three voltage regulators 86, 96, 106 are supplied with the output voltages VOUT, VOUT2, VOUT3. The three voltage regulators 86, 96, 106 provide first, second and third supply voltages VS1, VS2, VS3. The level of the three output voltages VOUT, VOUT2, VOUT3 is monitored by means of the three voltage dividers 87, 97, 107, the selection circuit 76 and the control device 70.

Advantageously, the supply voltages VS1, VS2, VS3 can be provided by means of the three voltage regulators 86, 96, 106 and exhibit a lower ripple and a higher precision with regard to achieving a respective reference value compared to the three output voltages VOUT, VOUT2, VOUT3 of the voltage converter 10.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A voltage converter, comprising:
    a first, a second and a third capacitor which are connected in series in at least one operating state;
    an input for supplying an input voltage;
    an input change-over switch having an input side that is connected to the input of the voltage converter and an output side that is connected to at least two capacitors from the group comprising the first, the second and the third capacitor;
    an output for providing an output voltage and coupled to a capacitor from the group comprising the first, the second and the third capacitor; and
    a compensation circuit which is coupled to the first, the second and the third capacitor in such a manner that a first voltage of the first capacitor, a second voltage of the second capacitor and a third voltage of the third capacitor are adapted to one another;
    one switch each being used in the input change-over switch and/or in the compensation circuit,
    wherein said one switch comprises a switching element and a resistor which are arranged in series connection, with the resistor being realized as a controllable resistor which is connected to an amplifier at a control input, and the amplifier having its input side connected to the output of the voltage converter and a voltage source, or
    said one switch being realized as a transistor with a turn-on resistance that is controlled by an amplifier, with the amplifier having its input side connected to the output of the voltage converter and a voltage source so that the transistor is operated in an ON state in which it has different turn-on resistances which are controlled by the amplifier as well as in an OFF state.

2. The voltage converter according to claim 1, comprising an output change-over switch which has its input side connected to at least two capacitors from the group comprising the first, the second and the third capacitor and has its output side connected to the output of the voltage converter.

3. The voltage converter according to claim 2, comprising a control device with
    a feedback input for supplying a feedback voltage which can be derived from the output voltage, wherein the feedback input can be coupled to the output of the voltage converter via an attachable electrical load,
    a first control output which is coupled to a control input of the input change-over switch, and
    a second control output which is coupled to a control input of the output change-over switch.

4. The voltage converter according to claim 1, wherein the compensation circuit comprises a compensating capacitor connected to the first capacitor in a first operating state, to the second capacitor in a second operating state and to the third capacitor in a third operating state, with the first, second and third operating states alternating periodically.

5. The voltage converter according claim 1, wherein the first, the second and the third capacitor are switched in series connection in a first operating state in a first order and in a second operating state in a second order which is different from the first order.

6. The voltage converter according to claim 1, comprising an output capacitor which is arranged between the output of the voltage converter and the reference potential terminal.

7. The voltage converter according to claim 1, wherein the output voltage (VOUT) is provided in approximation with a value according to the following equation:

$$VOUT = \frac{M}{L} \cdot VIN,$$

with VOUT being the value of the output voltage, VIN the value of the input voltage, L a first number of the capacitors from the group comprising the first, the second and the third capacitor which are connected in series between the input and a reference potential terminal in an operating state, and M a second number of the capacitors from the group comprising the first, the second and the third capacitor which are connected in series between the output and the reference potential terminal in said operating state.

8. The voltage converter according to claim 1, comprising at least one further capacitor which in at least one operating state is arranged in series connection to the first, the second and the third capacitor, wherein
    the input change-over switch has its output side coupled to the at least one further capacitor, the output of the voltage converter is coupled to the at least one further capacitor, and
    the compensation circuit is coupled to the at least one further capacitor in such a manner that at least one further voltage of the at least one further capacitor as well as the first, the second and the third voltage are adapted to one another.

9. The voltage converter according to claim 8, wherein the first and second electrodes of the four capacitors are coupled to a first, a second and a third node through one switch each,
    wherein the respectively first electrodes of the four capacitors are coupled to a fourth node via one switch each,
    wherein the second electrodes of the four capacitors are coupled to a reference potential terminal via one switch each, and wherein the input change-over switch selectively couples the input to one of the four nodes.

10. A method for voltage conversion, comprising the steps of:
- supplying an input voltage to an input of an input change-over switch;
- providing the input voltage selectively
  - at a first output of the input change-over switch connected to an electrode of a capacitor from a group comprising a first, a second and a third capacitor, or at least one further output of the input change-over switch connected to an electrode of a further capacitor from the group comprising the first, the second and the third capacitor, the first, the second and the third capacitor being connected in series at least in one operating state,
- adapting a first voltage of the first capacitor, a second voltage of the second capacitor and a third voltage of the third capacitor to one another by means of a compensation circuit; and
- providing an output voltage which can be tapped between an electrode of a capacitor from the group comprising the first, the second and the third capacitor and a reference potential terminal;
- one switch each being used in the input change-over switch and/or in the compensation circuit,
- said one switch comprising a switching element and a resistor that are arranged in series connection, with the resistor being realized as a controllable resistor which is connected to an amplifier at a control input, and the amplifier having its input side connected to the output of the voltage converter and a voltage source, or said one switch being realized as a transistor with a turn-on resistance that is controlled by an amplifier, with the amplifier having its input side connected to the output of the voltage converter and a voltage source so that the transistor is operated in an ON state in which it has different turn-on resistances which are controlled by the amplifier as well as in an OFF state.

11. The method according to claim 10, comprising:
- providing the input voltage selectively at an additional output of the input change-over switch connected to an electrode of at least one further capacitor, the at least one further capacitor being arranged in series connection with the first, the second and the third capacitor at least in one operating state;
- adapting the first, the second and the third voltage and at least one further voltage of the at least one further capacitor to one another; and
- providing the output voltage which can be tapped between an electrode of a capacitor from a group comprising the first, the second, the third and the at least one further capacitor and the reference potential terminal.

* * * * *